United States Patent [19]

Breidenbach et al.

[11] 4,264,673

[45] Apr. 28, 1981

[54] ORIENTED CELL POLYISOCYANURATE FOAM LAMINATE

[75] Inventors: Daniel J. Breidenbach, Wallingford; Stephen A. Knis, Meriden, both of Conn.

[73] Assignee: The Upjohn Company, Kalamazoo, Mich.

[21] Appl. No.: 149,113

[22] Filed: May 12, 1980

[51] Int. Cl.$^3$ .............................................. B32B 5/18
[52] U.S. Cl. ..................................... 428/310; 156/79; 428/422.8; 521/902
[58] Field of Search ...................... 428/310, 315, 422.8; 156/79; 521/902

[56] References Cited

U.S. PATENT DOCUMENTS

| | | | |
|---|---|---|---|
| 3,215,581 | 11/1965 | Carlson et al. | 264/46.2 |
| 3,453,168 | 7/1969 | Edwards et al. | 156/79 |
| 3,702,274 | 11/1972 | Wooler | 156/79 |
| 3,837,771 | 9/1974 | Kolakowski et al. | 425/374 |
| 3,903,346 | 9/1975 | De Leon et al. | 428/422.8 |
| 3,933,548 | 1/1976 | Anderson, Jr. et al. | 428/315 |
| 4,019,938 | 4/1977 | Forrester | 156/78 |
| 4,028,158 | 6/1977 | Hipchen et al. | 264/46.3 |
| 4,073,997 | 2/1978 | Richards et al. | 156/78 |
| 4,149,840 | 4/1979 | Tippmann | 425/371 |
| 4,204,019 | 5/1980 | Parker | 428/310 |

*Primary Examiner*—William J. Van Balen

[57] ABSTRACT

Rigid isocyanurate based foam laminate product is provided wherein the foam cells, which are normally inherently somewhat anisotropic as formed, are re-ordered in the finished laminate product to produce a multicoordinate, uniformly random pattern, cell axis orientation that enhances the physical properties of the finished product. A method of causing the multicoordinate cell axis re-ordering to occur during product manufacture is disclosed.

5 Claims, 6 Drawing Figures

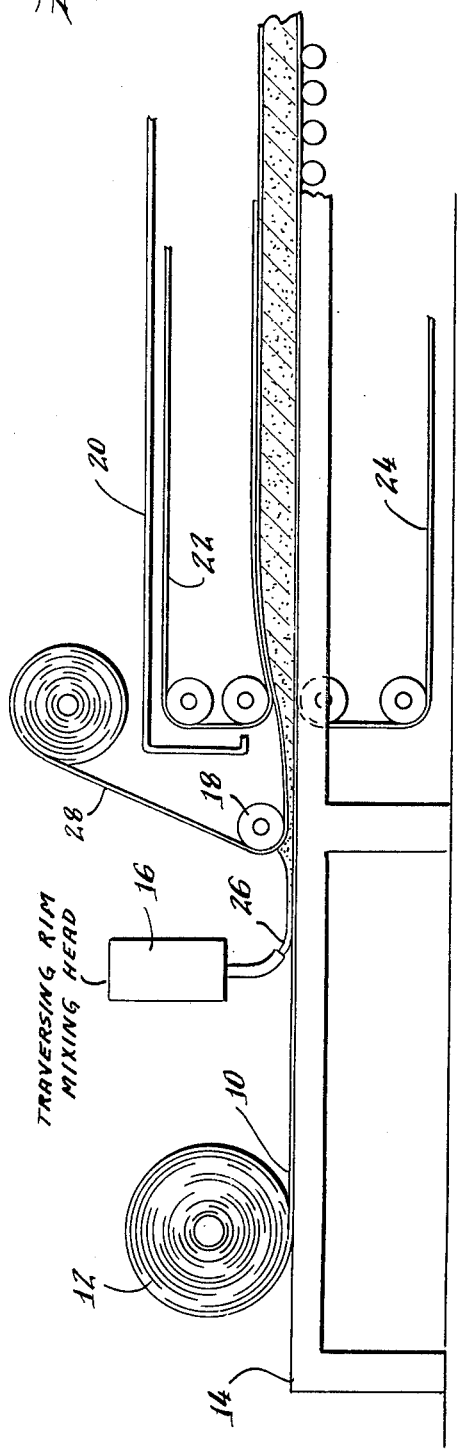
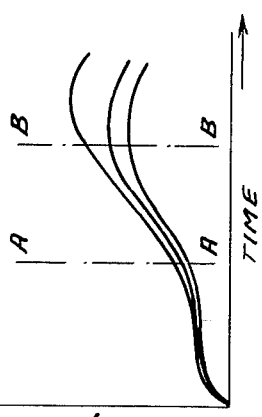
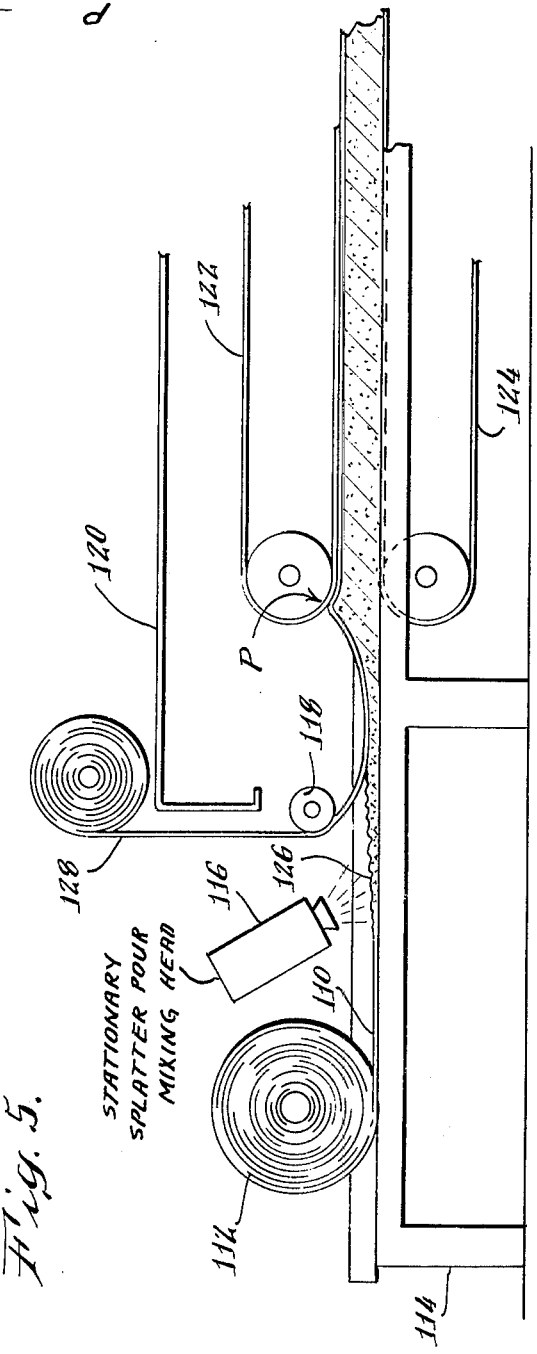

ORIENTED CELL POLYISOCYANURATE FOAM LAMINATE

BACKGROUND OF THE INVENTION

1. Field of the Invention

The subject matter of this invention concerns improvements in laminates comprised of polymer foam core sandwiched between facing sheets, and a method of producing such laminates which enhances their physical and thermal properties.

2. Description of the Prior Art

It is well known to produce laminate products on a continuous conveyor processing line, wherein the laminates have a polymer foam core flanked by opposed facing sheets adhered to the upper and under surface of the core. Many arrangements are used commercially for this but generally involve advancing a bottom sheet, which may be of flexible material such as paper, plastic film, metal foil, sheet metal and the like, along a conveyor surface while depositing on that sheet a reactive liquid polymer mix. The mix foams as it ages during further progress with the sheet along the conveyor, gradually rising into a blanket covering the entire facing sheet. An upper facing sheet is also applied after laydown of the foam mix, to complete the laminate, both upper and lower sheets becoming bonded to the foam as this continues to develope during advance along the conveyor, thus providing a finished product such as wallboard having a foam core sandwiched between facing sheets.

Examples of this general procedure are illustrated in prior patents of which Carlson et al Nos. 3,215,581, Edwards 3,453,168, Wooler 3,702,274, Kolakowski et al 3,837,771, Anderson et al 3,933,548, Forrester 4,019,938, Hipchen et al 4,028,158 and Tippmann 4,149,840, are the most pertinent to this invention known to the inventors herein. The objective of the prior patents in each case is to obtain continuous production of panelboard having various types of facing sheets bonded to an expanded polymeric form core, wherein the surfaces of the finished panelboard are smooth, planar, the finished board is of uniform thickness and the foam core is well adhered to the facing sheets and is of uniform density. Achieving this desired result presents very real practical problems in large scale continuous production, since many variables such as changes in foam mix formulation, ambient temperature conditions, as well as programmed altering of physical dimensions (e.g., thickness) of the panelboard are commonly involved. Maximizing the physical properties of the product, while coping with the numerous variables mentioned above, requires considerable skill on the part of personnel controlling the process and uniformity is not always achieved even by highly skilled personnel. Improvements in the process which assist an operator in getting consistently uniform product are accordingly of considerable commercial importance.

SUMMARY OF THE INVENTION

The invention here is directed to improvements in providing a smooth surfaced laminate comprising opposed facing sheets bonded to an intermediate foamed plastic core, wherein maximizing of desired foam properties is facilitated. Generally speaking, the invention relates to commercially practical laminate production wherein a foamable polymeric mix is deposited on an advancing lower facing sheet on a conveyor, superimposing an upper facing sheet to sandwich the foam mix between the facing sheets, and then applying controlled pressure to the upper surface of the laminate as it is advanced by the conveyor. It is a characterizing feature of the invention that the application of this pressure to the laminate is timed to coincide with a condition of foam cell development such that cell integrity has been established (that is, the foam has developed cells with definite individual wall structure), yet the state of gelling of the polymerizable plastic material forming the cell walls has not reached the stage where the foam mass has lost all mobility or flowability of the individual cells. Advantage is taken of this rather transient state in the freedom of the cells to move about within a matrix of foam, and during this condition to deliberately impose vertical pressure on the laminate, through an overhead conveyor spaced from the lower conveyor a distance slightly less than the full unrestrained height of the foam at that point. The overhead constraint coacts with lateral walls on the conveyor to product a "tunnel" so that the developing foam is restrained against further sidewise or vertical development, while is also restrained downstream of the conveyor by more mature foam which has become sufficiently rigidified to act as a dam against flow in that direction. The net result of these restraints is to impart a reverse or upstream component of flow in the foam adjacent the point of imposition of controlled pressure. This reverse flow component produces a rolling reaction of the cells in that region of the foam. Due to ambient conditions present during development of the foam, most of the foam cells are inherently anisotropic when fully formed; that is, have an elongation along one axis. The rolling reaction spoken of above thus tends to re-order the angular positions of the axes of cell non-isotropicity, and produces random orientation of that non-isotropicity, countering a natural tendency for the cells to orient themselves with their anisotropic axes generally parallel to each other. Such random reorientation brought about by the invention improves both the physical and thermal characteristics of the foam when it become rigidified, at which time the cells of course become locked in fixed condition and are retained in that condition in the finished product.

The cell structure and reorientation in laminates produced in accoradnce with the invention, in comparison with that produced by the prior art, is visually apparent upon inspection of cross-sections of panelboard, particularly from enlarged photographs of such cross sections. Examples of this are shown in the accompanying drawings.

DESCRIPTION OF THE DRAWINGS

FIGS. 1, 2 and 3 are photographic enlargements of cross sections of foam cores taken from panelboards of identical thickness and foam mix composition, wherein FIGS. 1 and 2 are representative of the product produced by prior art methods, while FIG. 3 is representative of product of this invention;

FIG. 4 is a simplified schematic view in side elevation of typical apparatus employed in the conventional (prior art) method of producing foam board;

FIG. 5 is a corresponding schematic of apparatus employed in practicing the present invention; and FIG. 6 is a representative plot of internal foam pressure developed against elapsed time subsequent to mixing of various typical foam compositions.

DETAILED DESCRIPTION OF INVENTION

Figure 1:
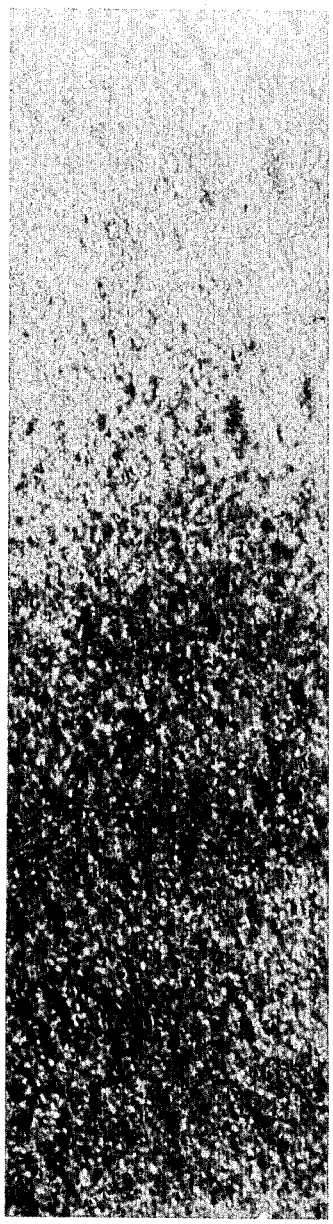

In the processing line schematically shown in FIG. 4 of the drawing, the typical prior art method of foam core panelboard production is illustrated. Under that system, a bottom facing sheet 10 is drawn off a supply roll 12 and advanced along a conveyor 14 by means presently to be described, passing under a mixing head 16, then under a nip roll 18, into a curing oven 20 and between pressing conveyors 22, 24, emerging finally from oven 20 at the downstream end (not shown). A polymeric foam mix is generated in mixing head 16 through interaction of several reactive liquid components supplied to the head, all of which is standard practice and well known in the art of preparing isocyanate based mixtures for use in urethane foam production. The mixed components are discharged from head 16 as a semiviscous fluid stream 26 which is deposited as a liquid in ribbon-like form of zig-zag pattern across the width of the lower facing sheet 10. This pattern is produced by reciprocating the head 20 transversely of the conveyor as the facing sheet is advanced therealong. As the facing 10 with polymer mix carried thereon advances beneath nip roll 18, an upper facing sheet 28 is trained over the roll and thus is brought into superimposed relation to lower sheet 10 and deposited liquid mix. Nip roll 18 acts somewhat as a doctor-blade to re-distribute the liquid mix as a uniform coating across the width of the conveyor (facing sheet), as well as metering the thickness of that coating on the sheet. The metering of the coating is controlled primarily by the spacing of nip roll 18 from the surface of conveyor 14 (facing sheet 10).

At this point the mix is still a relatively mobile, fluid, liquid in wich foam bubbles or cells are only incipiently developing. The laminate comprised of lower facing sheet 10, core 26 of developing foam mix, and upper facing sheet 28 advances from under nip roll 18 toward curing oven 20. The travel of the laminate from nip roll 18 to oven 30 is designed or adjusted to allow the foam to develope and rise, as shown in exaggerated fashion in FIG. 4, to essentially the full height or thickness to be attained in the finished product. The laminate is then passed between presser rolls or conveyors 22, 24 which serve to complete the bonding of the facing sheets to the core, smooth out surface irregularities, and ensure uniform thickness of the panelboard. In this prior art process, the objective is to allow rise of the foam between the nip roll and presser conveyors so as to develope uniform foam density and maximum cell isotropicity before any substantial smoothing forces are applied. Thus by the time the presser conveyors 22, 24 are contacted by the advancing laminate, the cell structure of the foam core is essentially rigidified and the presser conveyors serve primarily as means for conforming the finished product to a predetermined thickness specification through a compacting action. The presser conveyors also serve frictionally to engage and advance the panelboard toward the discharge (downstream) end of the curing oven, thus simultaneously drawing the facing sheets from their respective supply rolls for travel along the conveyor bed.

In contrast to the foregoing method, the method of this invention incorporates a different arrangement for depositing the foam mix on the lower facing sheet. The invention also differs in the manner and timing of applying presser conveyor contact to the laminate during its progress through the curing oven. These differences are schematically illustrated in FIG. 5 of the drawings, and will now be further described.

Referring to FIG. 5, the invention method employs a conveyor 14 as before, along which a bottom facing sheet 110 is advanced from a supply roll 112. Facing sheet 110 passes beneath a mixing head 116 from which foam mix is discharged in a manner different from that of its counterpart in FIG. 4. That is, the reactive polymer foam mix is discharged not as as coherent stream but as splattered droplets in a fanlike spray 126 of the liquid mix. This splatter pour technique of depositing the mix is known for other applications (See U.S. Pat. No. 4,019,938 mentioned above) and involves incorporating gas under pressure into the mix. This splatter technique produces a blanket of liquid mix across the width of the facing sheet, making traverse of head 126 unnecessary although this may be employed if desired to supplement the distribution effected by the fan-like discharge. Side restraints or walls 127 along the conveyor run prevent lateral escape of the mix and the foam which developes therefrom. In this instance metering of the mix to control thickness of the final foam core is accomplished entirely by the rate of discharge from the mixing head, since roll 118 is located a substantial distance above the conveyor and imparts no metering function at all. Roll 118 serves only as a guide over which the upper facing sheet 128 is trained as it is withdrawn from its supply roll, and sheet 128 is merely draped from that roll onto the mix-covered surface of lower sheet 110.

Presser conveyors 122, 124 engage the advancing laminate within a curing oven 130, as before, as it continues its advance; but the point of initial and continued engagement by the presser conveyor is controlled and arranged to meet certain conditions. This is, the initial contact of the laminate by presser conveyors 122, 124 is arranged to occur at at point determined by the state of physical development of the foam cells in the core. As the polymerizing action occurs in the reactive foam mix causing cells to form, the foam rises due to expansion of each cell brought on by the increase in pressure within those cells in the course of the reaction taking place. In ideal, unrestrained condition, the cell walls would expand uniformly to form truly isotropic cells, giving uniform dimension to each cell in all directions; i.e. spherical shape. Obviously that cannot and does not occur under practical conditions encountered since the expansion of one cell is inhibited by the adjacency of others, as well as the adjacency of barriers such as the facing sheets, side walls of the conveyor, etc. Acccordingly the foam cells develope into something other than truly isotropic shape; that is, they are anisotropic in actual practice. Due to the constraints mentioned above there is a general tendency for the foam cells to orient themselves with their anisotropic axes more or less vertical and parallel to each other in the finished product.

In the invention process, the anisotropic shape of the foam cells is taken advantage of, and the orientation of their axes realigned to improve the physical properties of the finished product. This is accomplished by adjusting the initial contact of presser conveyors 122, 124 with the laminate to occur at a point such that the state of foam cell wall integrity is essentially completed, yet the polymerization process has not reached that stage where the cellular walls are so rigidified that the cells can no longer move relative to each other in the foam matrix. This is a transient condition and the time when this occurs after mixing the components will depend not only on the chemical nature of the foam mix, the amount deposited on the facing sheet, but also such other factors as ambient temperature and pressure conditions to which the mix is subjected. Generally this condition corresponds to a condition where about 20% to 40% of the full cell size development still remains to be completed. The physical point or location corresponding to this transient condition during advance along conveyor 114 (as viewed in the schematic illustration of FIG. 5) will accordingly be determined by those conditions, and adjustment must be made to bring about initial contact of presser conveyors 122, 124 at the proper point. This can be done either by longitudinal adjustment of the point of mix lay-down (i.e., the location of mixing head 116), or by longitudinal adjustment of presser conveyors 122, 124. The adjustment of lay-down point is more practical usually and is accordingly the preferred arrangement.

By timing the initial contact of the presser conveyors 122, 124 with the laminate to coincide with the transient foam cell state described above, reorientation of the axes of the cells is caused to occur immediately prior to the point where the cell structure development becomes effectively "frozen"; i.e., so rigidified as to prevent further change in orientation. It appears that the axis reorientation spoken of here is occasioned by engagement of presser conveyors 122, 124 with the laminate, causing a rolling action to occur, as at P in FIG. 5, within the still somewhat mobile liquid foam mix trapped vertically and laterally between the facing sheets and the side walls 127 of conveyor 114. Since foam downstream of the initial point of presser contact is more mature and consequently more rigid than foam mix upstream of that point, the only freedom of movement available to the foam is in the upstream direction at the point of initial presser contact. Thus the presser contact causes a rolling wave action of the foam between the facing sheets in a backward or upstream direction. The depiction of this in FIG. 5 is exaggerated for illustration purposes. This rolling produces reorientation of the foam cells so that their anisotropic axes, which as mentioned above tend to be vertical and parallel under conditions of normal development, are changed into a multi-coordinate random condition; i.e., extending in multiple, non-aligned, directions. The application of pressure by presser conveyors 122, 124, which typically is on the order of from 2 ounces to 5 pounds per square inch, effects the reorienting mentioned above. This pressure is maintained only long (i.e., only extends along the conveyor) enough to ensure that gellation is achieved in the foam to a degree sufficient to prevent return to initial (vertical, parallel oriented) condition. Thus the extent or area of pressure application by the presser conveyor is limited, and the contact pressure is reduced once the continuing polymerizing reaction taking place in the foam reaches a stage where there is insufficient fluidity or mobility to allow further cell axis reorientation to occur. Variable spacing control (not shown) at the downstream ends of conveyors 122, 124 provides the most convenient way of adjusting the length of pressure application on the laminate along the conveyor.

In FIG. 6 there are shown plots of time versus internal foam cell pressure. These are schematic but representative of common isocyanate based foam mix formulations. As is apparent, there is a generally common characteristic curve for all of the different mixes. In using such mixes in the practice of this invention, the point of initial contact of the presser conveyors with the laminate is set to coincide with that region of the foam development falling between lines A—A and B—B along the time axis of the plot, to provide the desired cell reorientation discussed above. As mentioned before, this is most readily controlled by adjusting the position of mixing head 116 relative to presser conveyors 122, 124; that is, the distance of the point of mix lay down on lower facing sheet 110 from the point of initial contact of the laminate with presser conveyors 122, 124 in the curing oven.

Figure 2:
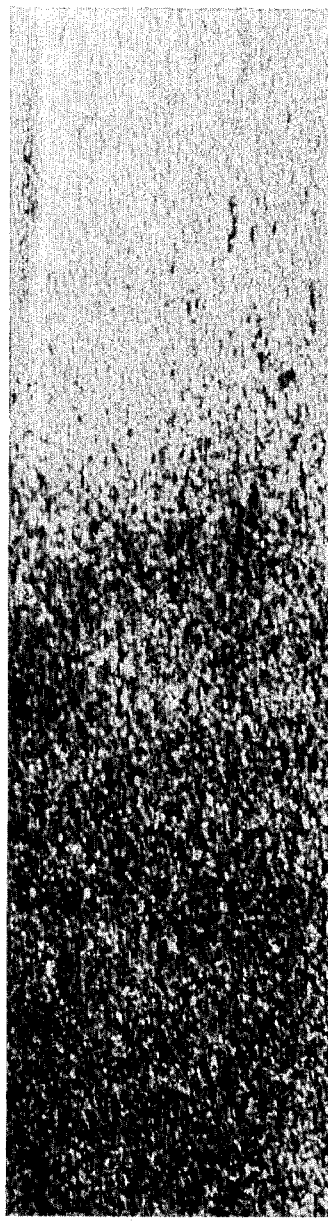
Figure 3:
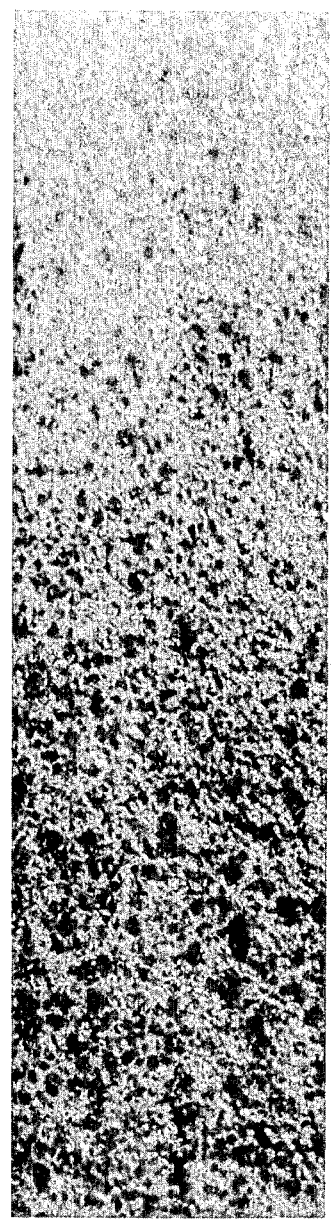

The effect on the cell structure in the foam core of the laminate produced by different methods of laminate manufacture is readily apparent from magnified cross sectional views of the resulting product. In FIGS. 1, 2 and 3 of the accompanying drawings, three foam samples are shown in magnified cross-section. All samples are made from the identical foam mix formulation, the only variable introduced in making the samples being the methods employed in fabrication. The foam sample seen in FIG. 1 is taken from panelboard made in accordance with the prior art method described in connection with FIG. 4 above. The foam sample of FIG. 2 is taken from panelboard made in accordance with the same prior art (nip roll) procedure, but substituting for the mixing head of FIG. 4, one providing a fan spray discharge of the liquid mix like that used in the present invention. FIG. 3 illustrates a sample of foam from a panelboard made in accordance with this invention. It is apparent that mere substitution of spray or splatter application of the mix for standard zig-zag stream application, as represented by the samples of FIGS. 2 and 1 respectively, does not produce the same reorientation of cell structure as that of the invention illustrated in FIG. 3. In other words the combination of fan spray application, plus timing and pressure of initial contact of presser conveyors with the laminate to coincide with the transient condition in the cycle of foam development, as described above, is essential to achieve the benefits of this invention. Tests show that products of the present invention are more resistant to damage under the standard Factory Mutual Heat Damageability Test at 550° F. than are comparable products produced by the conventional nip roll method (cf FIG. 4). Products of the invention have shown a strong resistance to warping and swelling of laminate board when exposed to the foregoing test, indicating superiority over conventionally produced panelboard when used in roof deck applications.

We claim:

1. In a process for the continuous manufacture of a laminate product having a isocyanurate based foam core sandwiched between and bonded to opposed facing sheets, wherein conveying means advances a lower of said facing sheets past a pour station while a liquid isocyanurate based foam-forming mix is deposited on said lower sheet at said pour station, and wherein means located at a point downstream of said pour station feeds an upper facing sheet at synchronous speed into superimposed relation onto said lower sheet bearing the foam mix and said sheets continue to advance while said foam mix is expanding to form foam cells which make up said foam core of said laminate, said foam cells being inherently of anisotropic structure as formed, the improvement which comprises:

depositing said liquid foam mix on said lower sheet at said pour station by a splatter pour technique, bringing said upper facing sheet into said superimposed relation with the lower whereby initial contact with the deposited foam is made solely under the influence of gravity, advancing said laminate of facing sheets and developing foam without vertical restraint until said foam cells are developed to a state providing cell wall integrity but before gellation of the mix prevents all relative movement between the cells, and at said last point passing the laminate between vertical restraining means to impose predetermined pressure on said facing sheets sufficient to cause said foam cells to roll about intermediate said facing sheets to effect random multicoordinate reorientation of the inherently anisotropic individual cell structures in the foam core.

2. A process as defined in claim 1, which includes the step of adjustably positioning the pour station along said conveyor relative to said point where said laminate passes between said vertical restraining means to vary the elapsed time of laminate travel from said pour station to said initial contact point.

3. A process as defined in claim 1, which includes the step of adjusting the spacing between said vertical restraining means at the downstream end thereof to determine the extent along the conveyor of pressure contact maintained on said laminate.

4. A laminate product having an isocyanurate based foam core sandwiched between and bonded to opposed facing sheets produced by the method defined in claim 1.

5. A laminate product having an isocyanurate based foam core sandwiched between and bonded to opposed facing sheets, wherein the foam cells are of anisotropic form and their anisotropic axes are arranged in random, multicoordinate, direction.

* * * * *